US010298623B2

(12) United States Patent
Bouthemy

(10) Patent No.: US 10,298,623 B2
(45) Date of Patent: May 21, 2019

(54) SEAMLESS WEB REAL-TIME COMMUNICATION SUPPORT ON MOBILE APPLIANCES

(71) Applicant: T-Mobile USA, Inc., Bellevue, WA (US)

(72) Inventor: Jean-Luc Bouthemy, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 258 days.

(21) Appl. No.: 14/310,924

(22) Filed: Jun. 20, 2014

(65) Prior Publication Data

US 2015/0373056 A1 Dec. 24, 2015

(51) Int. Cl.
*G06F 15/16* (2006.01)
*H04L 29/06* (2006.01)
*H04L 29/08* (2006.01)

(52) U.S. Cl.
CPC ...... *H04L 65/1006* (2013.01); *H04L 65/1033* (2013.01); *H04L 65/1073* (2013.01); *H04L 67/306* (2013.01); *H04L 63/08* (2013.01); *H04L 65/80* (2013.01)

(58) Field of Classification Search
CPC . H04L 63/08; H04L 65/1006; H04L 65/1033; H04L 65/80
USPC ........................................................ 709/203
See application file for complete search history.

(56) References Cited

U.S. PATENT DOCUMENTS

| 8,184,623 | B2* | 5/2012 | Barriga | H04L 29/12188 370/352 |
| 8,457,109 | B2* | 6/2013 | Thalanany | H04L 63/10 370/352 |
| 8,601,144 | B1* | 12/2013 | Ryner | G06F 21/45 709/228 |
| 2006/0168323 | A1* | 7/2006 | Kim | H04L 29/06027 709/238 |
| 2009/0043901 | A1* | 2/2009 | Mizikovsky | H04L 63/06 709/229 |
| 2009/0175215 | A1* | 7/2009 | Chen | H04W 76/12 370/328 |
| 2009/0268672 | A1* | 10/2009 | Kline | G06F 17/30902 370/328 |
| 2011/0093933 | A1* | 4/2011 | Lindholm | H04L 63/107 726/5 |
| 2011/0099227 | A1* | 4/2011 | Walls | H04L 12/1822 709/204 |

(Continued)

Primary Examiner — Vivek Srivastava
Assistant Examiner — Atta Khan
(74) Attorney, Agent, or Firm — Han Santos, PLLC

(57) ABSTRACT

Techniques pertaining to seamless WebRTC support on mobile appliances are described. In one aspect, a method includes one or more processors of one or more gateway servers receiving from a browser-based application executed by a mobile device a request for access to multimedia provided by a multimedia access platform. The method also includes the one or more processors retrieving information related to a profile associated with a user of the mobile device from an identity and access management server. The method further includes the one or more processors enabling the browser-based application to receive from the multimedia access platform one or more types of multimedia based at least in part on the profile associated with the user of the mobile device.

47 Claims, 8 Drawing Sheets

(56) References Cited

U.S. PATENT DOCUMENTS

| | | | |
|---|---|---|---|
| 2011/0208778 A1* | 8/2011 | Mellmer | G06F 21/31 707/783 |
| 2011/0258300 A1* | 10/2011 | Hao | H04L 65/1016 709/221 |
| 2011/0277016 A1* | 11/2011 | Hockings | G06F 21/41 726/4 |
| 2013/0089033 A1* | 4/2013 | Kahn | H04W 28/22 370/329 |
| 2013/0125226 A1* | 5/2013 | Shah | H04L 63/0815 726/7 |
| 2013/0232553 A1* | 9/2013 | Tomfohrde | G06F 21/10 726/4 |
| 2014/0040376 A1* | 2/2014 | Oh | H04L 61/1594 709/204 |
| 2014/0066084 A1* | 3/2014 | Paladugu | H04W 28/24 455/452.2 |
| 2014/0181003 A1* | 6/2014 | Kling | G06F 16/254 707/600 |
| 2014/0222894 A1* | 8/2014 | Gangadharan | H04L 67/02 709/203 |
| 2014/0223452 A1* | 8/2014 | Santhanam | H04L 67/141 719/328 |
| 2015/0033300 A1* | 1/2015 | Timariu | H04L 63/168 726/5 |

* cited by examiner

SEAMLESS WEB REAL-TIME COMMUNICATION SUPPORT ON MOBILE APPLIANCES

BACKGROUND

Web Real-Time Communication (WebRTC) is an application programming interface (API) being currently defined by standardization bodies including the World Wide Web Consortium (W3C), the Internet Engineering Task Force (IETF), the 3$^{rd}$ Generation Partnership Project (3GPP), Mobile Open Alliance (OMA), and the Alliance for Telecommunications Industry Solutions (ATIS). WebRTC is designed to support browser-to-browser applications for voice calling, video chat, peer-to-peer (P2P) file sharing and access to other multimedia contents without plugins. It is an ongoing activity within IETF and W3C to enable real-time communications from or to web browsers using multimedia (e.g., audio, video and auxiliary data, such as calendar and address book). The purpose of WebRTC is to create a set of specifications that allows browsers to function as an effective platform for applications that use and exchange real-time, interactive communication in multimedia.

At the present stage, WebRTC is more mature in desktop environments than for mobile appliances. WebRTC is supported at this time for Google Chrome and Mozilla Firefox. However, additional capabilities (such as authentication/authorization, QoS, user interface for consent when receiving a call) are required to provide an acceptable user experience in mobile environment. There are a number of challenges with respect to providing WebRTC on mobile platforms. For example, as WebRTC is running as an over-the-top application, not as an optimized operator service, poor user experience of WebRTC and poor usage of scarce radio resources may result. Additionally, in order to avoid losing access to WebRTC services when a mobile device enters into a sleep mode, the sleep mode may be disabled on the mobile device but this work-around may reduce battery time due to battery drain. Moreover, a user may need to open an app or his/her web browser if WebRTC capable and to authenticate with the network before initiating or receiving real-time communication services (e.g., voice and video calls, messaging, presence), which is not a seamless experience. Furthermore, there is no support for IP address change on mobile devices, for example, due to network change (e.g., Wi-Fi, High-Speed Packet Access (HSPA), Evolved High-Speed Packet Access (HSPA+), or Long Term Evolution (LTE)). Besides, there are presently no semantics on the data channel.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
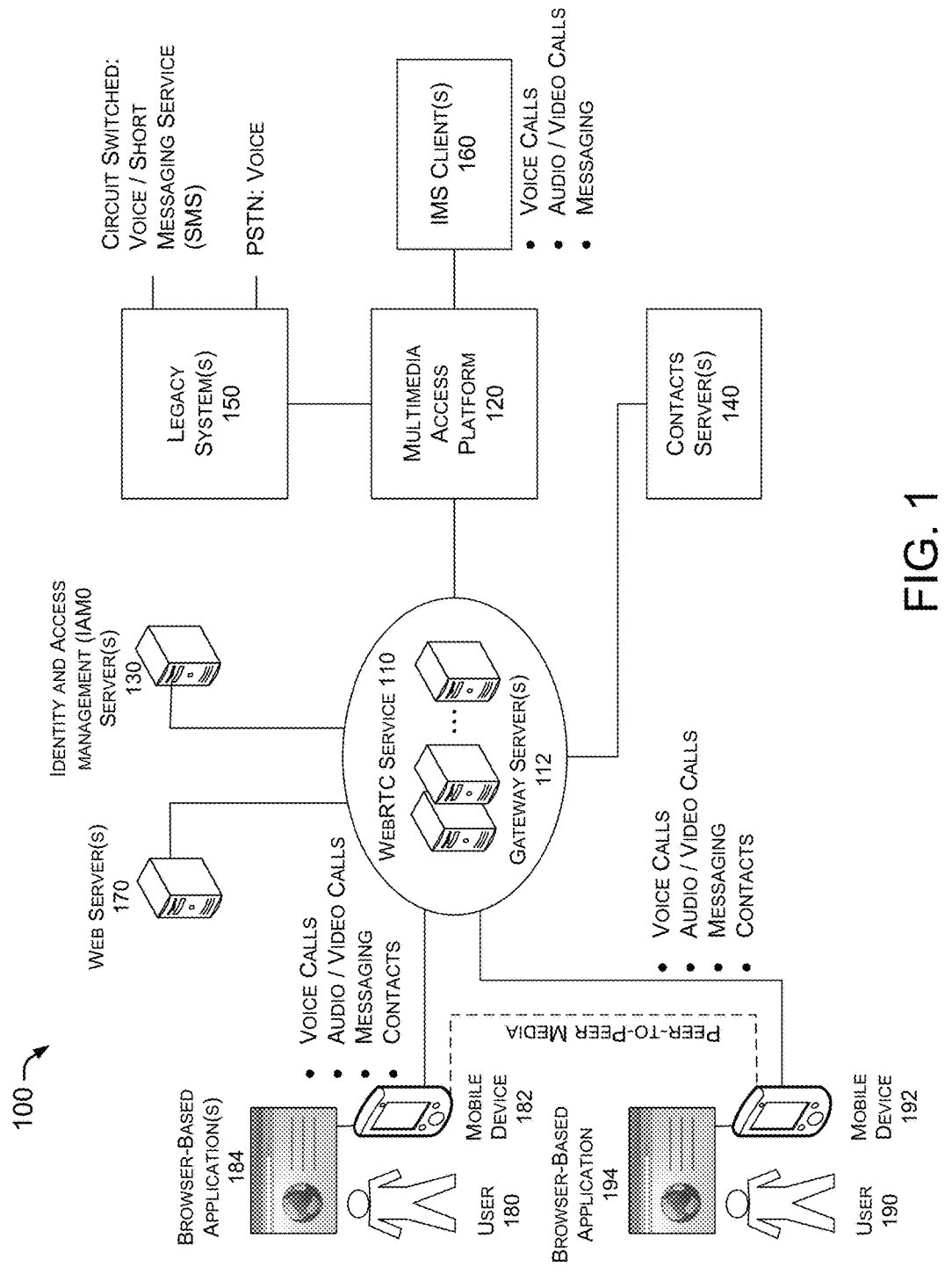
FIG. 1 illustrates an example network architecture in which support for seamless WebRTC on mobile appliances/platforms is implemented in accordance with embodiments of the present disclosure.

The present disclosure describes techniques that support seamless WebRTC on mobile appliances and platforms across networks. For example, WebRTC on a mobile device may be implemented as a hybrid or native browser-based application running on, or executed by, the mobile device. The browser-based application may authenticate with a network and, upon successful authentication, access services including network-initiated services such as, for example, receiving calls, messaging, receiving presence states and/or notifications. Techniques of the present disclosure enhance user experience, avoid battery drain, and support IP address changes on the mobile device.

According to one aspect, a method may include one or more processors of one or more gateway servers, e.g., one or more WebRTC gateway servers, receiving from a browser-based application running on, or executed by, a mobile device a request for access to multimedia provided by a multimedia access platform, which may include either or both of an IP multimedia subsystem (IMS) and an extensible messaging and presence protocol (XMPP) platform. The method may also include the one or more processors retrieving information related to a profile associated with a user of the mobile device from an identity and access management (IAM) server. The method may further include the one or more processors enabling the browser-based application to receive from the multimedia access platform one or more types of multimedia based at least in part on the profile associated with the user of the mobile device.

According to another aspect, a computing device may include memory, configured to store at least a set of instructions, and one or more processors coupled to the memory and configured to execute the set of instructions to perform operations. The operations may include: receiving from a browser-based application running on, or executed by, a mobile device a request for access to multimedia provided by a multimedia access platform, which may include either or both of an IP multimedia subsystem (IMS) and an extensible messaging and presence protocol (XMPP) platform; retrieving information related to a profile associated with a user of the mobile device from an IAM server; and enabling the browser-based application to receive from the multimedia access platform one or more types of multimedia based at least in part on the profile associated with the user of the mobile device.

According to yet another aspect, a method may include communicating, by a browser-based application running on, or executed by, a mobile device, with an IAM server for authentication by the IAM server. The method may also include transmitting to a gateway server a request for access to multimedia provided by a multimedia access platform, which may include either or both of an IMS and an XMPP platform. The method may further include receiving from the multimedia access platform one or more types of multimedia.

According to still another aspect, a method may include registering, by a browser-based application running on, or executed by, a mobile device, with an IAM server of a network upon the browser-based application being launched. The method may also include transmitting to the gateway server one or more messages each of which having a respective level of a plurality of levels of quality of service (QoS).

According to a further aspect, a mobile device may include memory, configured to store at least a set of instructions, and one or more processors coupled to the memory and configured to execute the set of instructions to perform operations. The operations may include: executing a browser-based application to communicate with an IAM server for authentication by the IAM server; transmitting to a gateway server a request for access to multimedia provided by a multimedia access platform; and receiving from the multimedia access platform one or more types of multimedia.

Techniques of the present disclosure may be implemented, in part, in the forms of methods, devices, systems and network architecture in a number of ways. Example implementations are provided below with reference to the following figures.

Example Network Architecture

FIG. 1 illustrates an example network architecture 100 in which support for seamless WebRTC on mobile appliances/platforms is implemented in accordance with embodiments of the present disclosure.

As shown in FIG. 1, example network architecture 100 includes a WebRTC service 110, a multimedia access platform 120, one or more identity and access management (IAM) servers 130, one or more contacts servers 140, one or more legacy systems 150, one or more IP multimedia subsystem (IMS) clients 160 and one or more web servers 170. WebRTC service 110 may include one or more WebRTC gateway servers 112. The one or more legacy systems 150 include, for example, circuit-switched voice calls and short messaging service as well as public switched telephone network (PSTN). The one or more IMS clients 160 include, for example, voice calls, audio/video calls and messaging. Example network architecture 100 also includes one or more mobile devices each of which associated with a respective user. For illustrative purpose, FIG. 1 shows mobile device 182 and mobile device 192 that are associated with user 180 and user 190, respectively. One or more browser-based applications 184 are running, e.g., being executed, on mobile device 182, and one or more browser-based applications 194 are running on, or executed by, mobile device 192.

Those skilled in the art would appreciate that, although a certain number of network nodes and elements are illustrated in FIG. 1, techniques described herein also apply to alternative network architectures having different numbers of network elements/nodes. For instance, although two mobile devices (and their associated users and browser-based applications) are shown in FIG. 1, scope of the present disclosure covers implementations with different numbers of mobile devices (and associated users and browser-based applications). Moreover, for simplicity and not to obscure understanding of techniques of the present disclosure, certain network elements/nodes typically found in telecommunication networks are not illustrated in FIG. 1.

Example network architecture 100 utilizes multimedia access platform 120, to provide seamless WebRTC support for mobile appliances/platforms. In example network architecture 100, one or more WebRTC applications are executed in WebRTC-capable browsers as hybrid or native applications. For example, one or more browser-based application 184 and 194 are run on mobile devices 182 and 192, respectively. Multimedia access platform 120 is an external system to the one or more WebRTC gateway servers 112 of WebRTC service 110. In some embodiments, multimedia access platform 120 may include an IP multimedia subsystem (IMS). In some alternative embodiments, multimedia access platform 120 may include an extensible messaging and presence protocol (XMPP) platform. In other embodiments, multimedia access platform 120 may include a dual platform supporting IMS and XMPP interworking, which includes protocol translation and identity mapping. That is, multimedia access platform 120 may include either or both of an IMS and an XMPP platform. The one or more IAM servers 130 support single sign-on (SSO) to authenticate and authorize WebRTC users (e.g., users 180/190). The one or more IAM servers 130 contain a profile of each WebRTC users to support key management and identity mapping between WebRTC users and multimedia access platform 120. For instance, the one or more browser-based applications 184 run on mobile device 182, which is associated with user 180, may access some or all of the one or more IMS clients 160 through multimedia access platform 120 upon the user 180 being authenticated and authorized by the one or more IAM servers 130. Which one(s) of the one or more IMS clients 160 may be accessed by the one or more browser-based applications 184 depends on the user profile of user 180. Likewise, which one(s) of the one or more IMS clients 160 may be accessed by the one or more browser-based applications 194 depends on the user profile of user 190. The one or more web servers 170 host WebRTC web page which may be accessed by the one or more browser-based applications 184 and the one or more browser-based applications 194. The one or more contacts server 140 are external to the one or more web servers 170 and contain information related to contacts of each WebRTC users such as, for example, some or all of the following pieces of information: name, phone number(s), physical address(es), email address(es), account name(s), etc. In various embodiments, at least one of the one or more contacts servers 140 may be an Extensible Markup Language (XML) Data Management Server (XDMS).

The one or more WebRTC gateway servers 112 abstract the complexity of the IMS signaling protocol such as, for example, Session Initiation Protocol (SIP) for WebRTC users, e.g., mobile devices 182/192. In various embodiments, the one or more WebRTC gateway servers 112 also translate media between WebRTC and IMS domains when media is anchored in a service provider's network. For instance, in translating media, the one or more WebRTC gateway servers 112 may perform media adaption including, in some cases, translation between codecs.

In a typical scenario according to the present disclosure, a user (e.g., user 180 or 190), or the WebRTC application (e.g., browser-based application 184 or 194) executed by the user's mobile platform (e.g., mobile device 182 or 192), performs authentication with the one or more IAM servers 130 to obtain authorization. The authorization triggers an IMS registration and registering the authorized state of the user with the WebRTC service 110 (e.g., in the one or more WebRTC gateway servers 112). The one or more WebRTC gateway servers 112 interface multimedia access platform 120 and the WebRTC application (e.g., browser-based application 184 or 194), and the one or more WebRTC gateway servers 112 may perform transcoding in needed (e.g., translating media between WebRTC and IMS domains by performing media adaption such as translation between codecs). The one or more WebRTC gateway servers 112 may also connect to other resources such as, for example, one or more contacts servers 140.

Additionally, communications between mobile devices 182 and mobile device 192 may be established for peer-to-peer media. For example, mobile devices 182 and mobile device 192 may support dedicated bearers to provide guaranteed quality of service or priority compared to other services.

Techniques of the present disclosure do not introduce any new change that would deteriorate the behavior or performance of the existing LTE CSFB service, and do not require regression testing. Moreover, techniques of the present disclosure add a new call flow and have no known or major conflict with existing call flows defined by the 3GPP standards. In various embodiments, techniques of the present disclosure may be implemented in MSCs of UMTS and GSM networks.

Example Network Architecture

Figure 2:
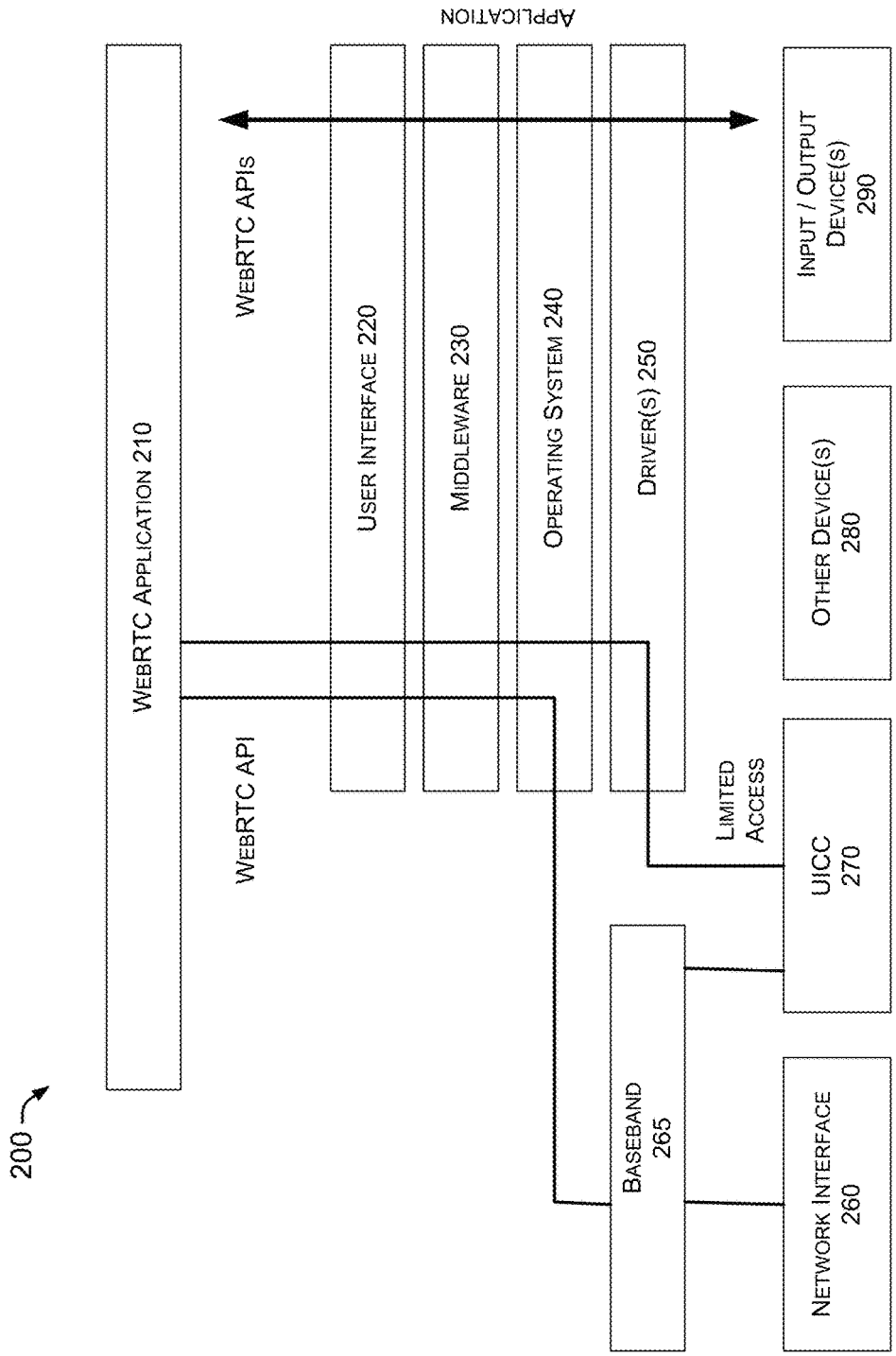
FIG. 2 illustrates an example mobile device architecture in accordance with an embodiment of the present disclosure.

FIG. 2 illustrates an example mobile device architecture 200 in accordance with an embodiment of the present disclosure.

As shown in FIG. 2, example mobile device architecture 200 includes WebRTC application 210, user interface 220, middleware 230, operating system 240, one or more drivers 250, network interface 260, baseband circuitry 265, universal integrated circuit card (UICC) 270, one or more other devices 280 and one or more input/output devices 290. Example mobile device architecture 200 may be implemented in any one of the mobile platforms in accordance with the present disclosure. For instance, example mobile device architecture 200 may be implemented in mobile device 182 and/or mobile device 192. Referring to FIG. 1 and FIG. 2, WebRTC application 210 communicates with a WebRTC gateway server (e.g., one or more WebRTC gateway servers 112) and/or the WebRTC application (e.g., browser-based application 184 or 194) executed by another mobile platform (e.g., mobile device 182 or 192) via user interface 220, middleware 230, operating system 240, baseband circuitry 265 and network interface 260.

For voice and video services, WebRTC application 210 do not rely on best-effort delivery (i.e., no attempt to provide guaranteed quality of service (QoS) level or priority compared to other services). To provide an acceptable user experience, for voice and/or video traffic, WebRTC application 210 may use dedicated bearers with guaranteed bit rate (GBR) instead of using non-GBR bearer (such as the default bearer which is used for transmission control protocol (TCP) traffic) to transport voice and/or video packets. Bearers may include signaling and media (e.g., Secure Real-time Transport Protocol). Bearer associated with media may provide GBR similar to voice-over-IP (VoIP) LTE services. In some embodiments, signaling may be similar in characteristics as signaling for IMS.

In some embodiments, QoS for the bearers used for IMS services may be defined in the manners described below. Bearers for IMS signaling may be defined as non-GBR, with a delay budget of 150 ms and $10^{-6}$ packet loss rate. Bearers for media associated with voice calls may be defined as GBR, with a delay budget of 100 ms and $10^{-2}$ packet loss rate. Bearers for media associated with video calls may be defined as GBR, with a delay budget of 150 ms and $10^{-3}$ packet loss rate.

For WebRTC, dedicated bearers may be used to receive better treatment (e.g., for better user experience), and may be defined in traffic flow templates. Traffic flow templates may be defined as packet filters associated with an Encapsulated PostScript (EPS) bearer. A packet filter may be associated with a protocol, a specific port, an IP packet destination or source address, or a combination of two or more of the above. For WebRTC, the IP address used may be the IP address of the WebRTC gateway for the signaling protocol (e.g., HTTP) and media protocol (e.g., SRTP).

In some embodiments, QoS class identifiers (QCIs) or re-use of QCIs associated with IMS services may be defined for WebRTC services. Alternatively, GBR bearers may be used as resources permanently allocated by admission control. These resources may be allocated at the bearer establishment or modification by an admission control function.

At least for EPS bearers, QoS parameters may include QCI and Allocation and Retention Priority (ARP). QCIs may be used by WebRTC application 210 to define one or more of the following: type of resource (e.g., either GBR or non-GBR), priority of the queue associated with a particular bearer, packet delay budget (e.g., possible latency of data packets transported between UE and packet-based gateway), and packet loss rate (PLR). PLR is defined as the rate of a number of service data units (SDUs) not successfully transported to the upper layer to a number of total SDUs processed by the link layer of the transmitting end for non-congested cases. ARP may be used by WebRTC application 210 to determine whether to accept or reject a request for establishing or modifying bearers in case of limited resources.

In some embodiments, WebRTC application 210 may support evolved packet system bearer (i.e., a bearer for LTE) corresponding to package data protocol (PDP) context for GPRS, UMTS (3G), HPSA or HSPA+.

In some embodiments, either a secondary PDP context may be activated or a primary PDP context may be modified to support WebRTC. Given the requirements of WebRTC (e.g., voice and video), this service may be supported on HSPA or HSPA+.

Baseband circuitry 265 may access UICC 270 to perform encryption and/or decryption.

Example Push Mechanism

Figure 3:
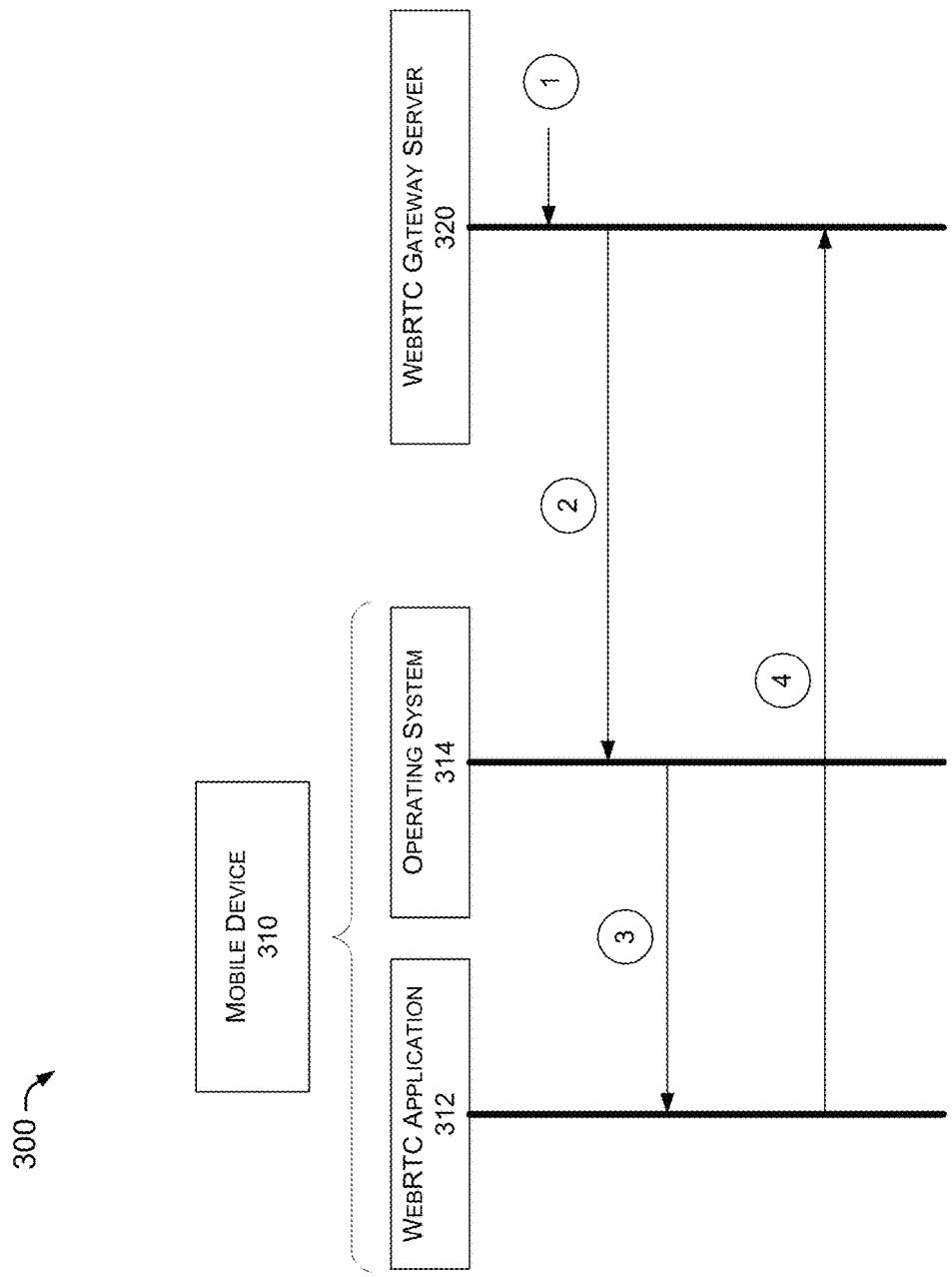
FIG. 3 illustrates an example push mechanism in accordance with an embodiment of the present disclosure.

FIG. 3 illustrates an example push mechanism 300 in accordance with an embodiment of the present disclosure.

As shown in FIG. 3, example push mechanism 300 includes a mobile device 310 and a WebRTC gateway server 320, and the mobile device 310 includes a WebRTC application 312 and an operating system 314. Example push mechanism 300 may be implemented in example network architecture 100, e.g., between one or more WebRTC gateway servers 112 of WebRTC service 110 and mobile device 182 and/or 192.

At step 1 of example push mechanism 300, an event from network is received by WebRTC gateway server 320. The event may be, for example, incoming call, incoming message or event such as presence or network deregistration. At step 2 of example push mechanism 300, WebRTC gateway server 320 sends a push signal/message to operating system 314 of mobile device 310. In turn, at step 3 of example push mechanism 300, operating system 314 wakes up WebRTC application 312 of mobile device 310. At step 4 of example push mechanism 300, WebRTC application 312 queries WebRTC gateway server 320 about the event (also referred to as the push event), e.g., using HTTP APIs. In some embodiments, when operating system 314 wakes up WebRTC application 312, operating system 314 may send information to WebRTC application 312 to indicate what the push event is. WebRTC gateway server 320 stores information about which type of device(s) it is connected to in order to select the proper push mechanism, as the push mechanism used may vary from device to device. For instance, depending on what type of device mobile device 310 is, the push mechanism may be one of the following: Mobile Status Notification Protocol (MSNP), Apple Push Notification Service (APNS), Android Cloud to Device Messaging (C2DM) or Google Cloud Messaging for Android (GCM).

WebRTC application 312 may perform a number of API calls, and WebSocklets may be used to carry media.

Example push mechanism 300 may also be used to provide a periodic registration of the mobile device 310 with the network.

Example Computing Device

Figure 4:
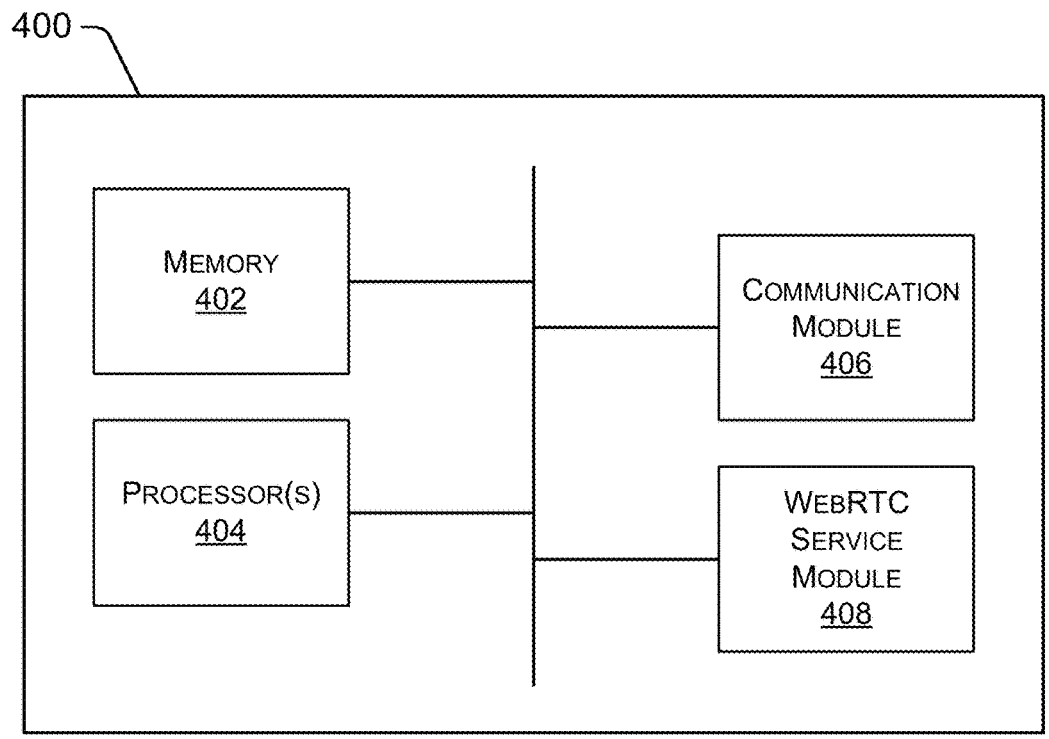
FIG. 4 illustrates a block diagram of an example computing device in accordance with an embodiment of the present disclosure.

FIG. 4 illustrates a block diagram of an example computing device 400 in accordance with an embodiment of the present disclosure.

As shown in FIG. 4, example computing device 400 includes memory 402, one or more processors 404 coupled to memory 402, communication module 406 coupled to the one or more processors 404, and WebRTC service module 408 coupled to the one or more processors 404. Example computing device 400 may be implemented in a gateway server such as any one of the one or more WebRTC gateway servers 112 of WebRTC server 110 of FIG. 1. Communication module 406 is controlled by the one or more processors 404 to communicate with other devices. Although WebRTC service module 408 is shown as a discrete, separate module from the one or more processors 404, in some embodiments WebRTC service module 408 is a logical concept and may be implemented as an integral part of the one or more processors 404. The one or more processors 404 may cause WebRTC service module 408 to perform operations described below.

Memory 402 may store at least a set of instructions. The one or more processors 404 may execute the set of instructions to perform a number of operations. The operations may include: receiving from a browser-based application executed by a mobile device a request for access to multimedia provided by a multimedia access platform, which may include either or both of an IMS and an XMPP platform; retrieving information related to a profile associated with a user of the mobile device from an IAM server; and enabling the browser-based application to receive from the multimedia access platform one or more types of multimedia based at least in part on the profile associated with the user of the mobile device.

In various embodiments, the one or more processors 404 may be further configured to perform operations including enabling the browser-based application to receive from the multimedia access platform the one or more types of multimedia after the user of the mobile device is authenticated by the IAM server.

In various embodiments, the one or more processors 404 may be further configured to perform operations including communicating with the multimedia access platform in accordance with SIP.

In various embodiments, in enabling the browser-based application to receive from the multimedia access platform one or more types of multimedia, the one or more processors 404 may be configured to translate media between the browser-based application and domains of the multimedia access platform.

In various embodiments, the one or more processors 404 may be further configured to perform operations including enabling the browser-based application to retrieve from an XDMS information of contacts associated with the user of the mobile device.

In various embodiments, the one or more processors 404 may be further configured to perform operations including communicating to the browser-based application by a push mechanism, and receiving a query from the browser-based application in response to the communicating. In various embodiments, the communicating to the browser-based application may include communicating to an operating system of the mobile device to wake up the browser-based application from a sleep mode. In various embodiments, the communicating to the browser-based application may include communicating to the browser-based application in response to receiving a notification regarding an event. In various embodiments, the event may include an incoming call for the user of the mobile device, an incoming message for the user of the mobile device, a presence state, or network degradation.

Example Mobile Device

Figure 5:
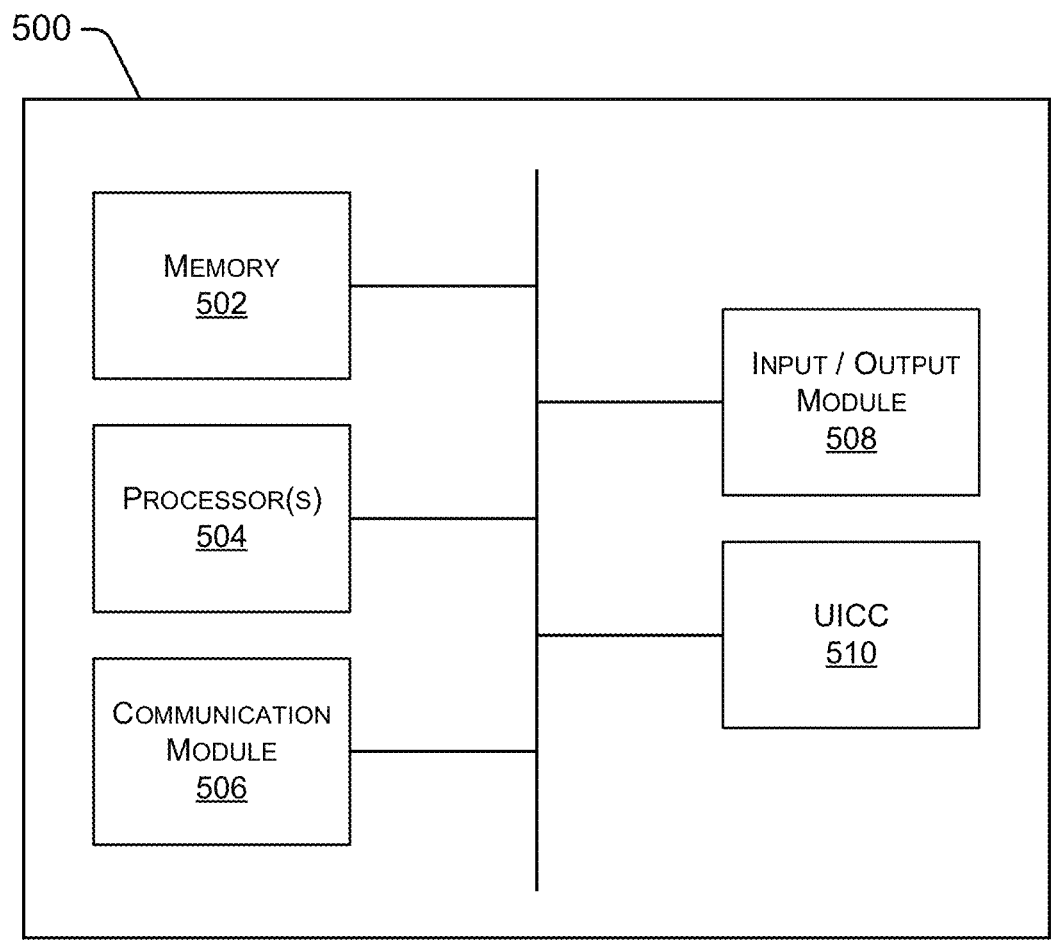
FIG. 5 illustrates a block diagram of an example mobile device in accordance with an embodiment of the present disclosure.

FIG. 5 illustrates a block diagram of an example mobile device 500 in accordance with an embodiment of the present disclosure.

As shown in FIG. 5, example mobile device 500 includes memory 502, one or more processors 504 coupled to memory 502, communication module 506 coupled to the one or more processors 504, input/output module 508 coupled to the one or more processors 504, and UICC 510 coupled to the one or more processors 504. Example mobile device 500 may be implemented in mobile device such as mobile device 182 and/or mobile device 192 of FIG. 1. Communication module 506 is controlled by the one or more processors 504 to communicate with other devices.

Memory 502 may store at least a set of instructions. The one or more processors 504 may execute the set of instructions to perform a number of operations. The operations may include: executing a browser-based application to communicate with an IAM server for authentication by the IAM server; transmitting to a gateway server a request for access to multimedia provided by a multimedia access platform; and receiving from the multimedia access platform one or more types of multimedia.

In various embodiments, the browser-based application may include a WebRTC application in accordance with W3C, and the browser-based application may include a native or hybrid web application.

In various embodiments, the one or more processors may be further configured to perform operations including retrieving from an XDMS information of contacts associated with a user of the mobile device.

In various embodiments, the one or more processors may be further configured to perform operations including receiving a communication from the gateway server, and transmitting a query to the gateway server in response to receiving the communication. In various embodiments, the receiving the communication may include receiving the communication by a push mechanism. In various embodiments, the receiving the communication from the gateway server may include receiving the communication from the gateway server in response to the gateway server receiving a notification regarding an event. In various embodiments, the event may include an incoming call for the user of the mobile device, an incoming message for the user of the mobile device, a presence state, or network degradation.

In various embodiments, the one or more processors may be further configured to perform operations including accessing one or more input devices or one or more output devices of the mobile device to support the browser-based application, and accessing a universal integrated circuit card (UICC) of the mobile device to support the browser-based application.

In various embodiments, the one or more processors may be further configured to perform operations including receiving periodically a wake-up message from the gateway server, and transmitting a response message to the gateway server in response to receiving the wake-up message.

In various embodiments, the one or more processors may be further configured to perform operations including transmitting a notification to the gateway server in response to a change of an IP address or a network associated with the mobile device.

Example Processes

Example processes described herein are illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the example processes.

Figure 6:
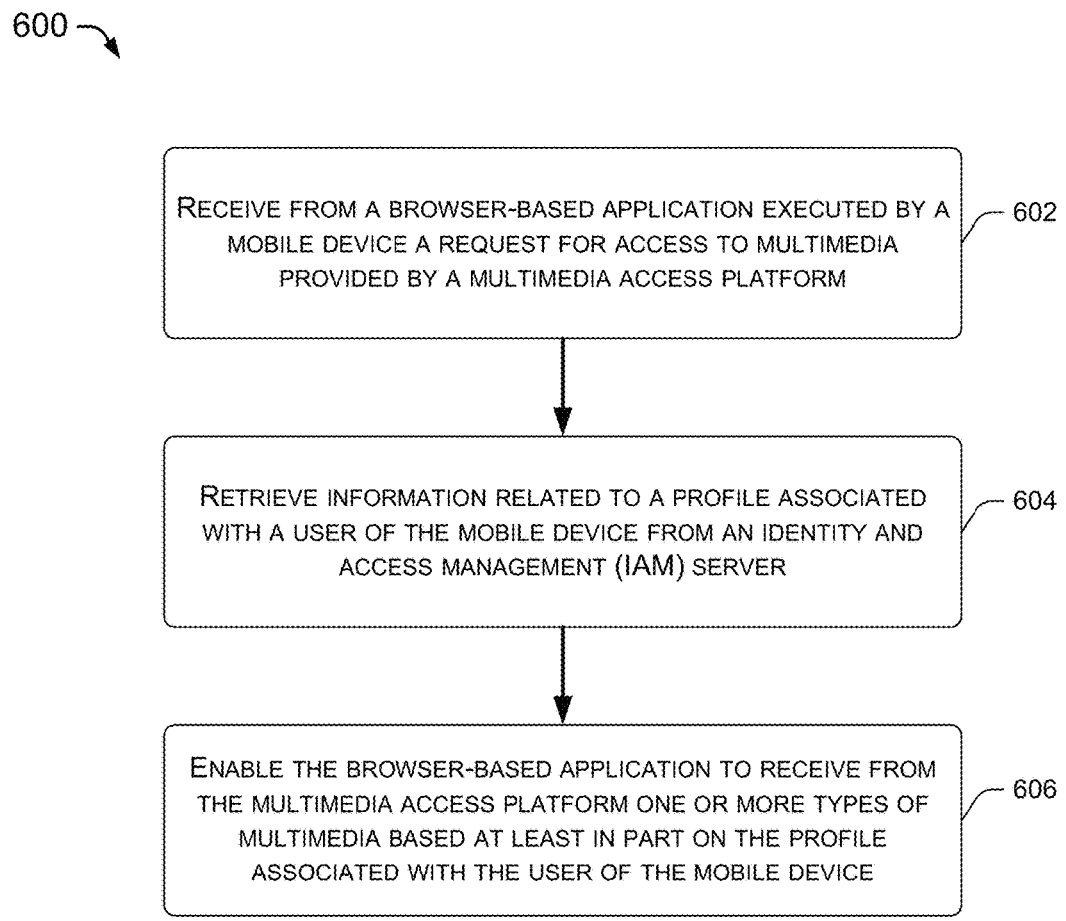
FIG. 6 illustrates a flow diagram of an example process implemented in a computing device in accordance with an embodiment of the present disclosure.

FIG. 6 illustrates a flow diagram of an example process 600 implemented in a computing device in accordance with an embodiment of the present disclosure. Process 600 may be implemented by the one or more WebRTC gateway servers 112 of FIG. 1 or example computing device 400 of FIG. 4. Further, process 600 may include one or more operations, actions, or functions depicted by one or more blocks 602, 604 and 606. For illustrative purpose, operations of process 600 are described below form the perspective of one or more processors of the one or more WebRTC gateway servers 112 of WebRTC 110 of FIG. 1. Process 600 may begin at 602.

At 602, one or more processors of one or more gateway servers 112 receive from a browser-based application (e.g., WebRTC-capable browser-based application 184 or 194) executed by a mobile device (e.g., mobile device 182 or 192) a request for access to multimedia provided by a multimedia access platform.

At 604, the one or more processors retrieve information related to a profile associated with a user of the mobile device from an IAM server (e.g., one or more IAM servers 130).

At 606, the one or more processors enable the browser-based application to receive from the multimedia access platform one or more types of multimedia based at least in part on the profile associated with the user of the mobile device.

In various embodiments, the enabling the browser-based application to receive from the multimedia access platform one or more types of multimedia may include enabling the browser-based application to receive from the multimedia access platform the one or more types of multimedia after the user of the mobile device is authenticated by the IAM server.

In various embodiments, the enabling the browser-based application to receive from the multimedia access platform one or more types of multimedia may include communicating with the multimedia access platform in accordance with a signaling protocol of the multimedia access platform. The multimedia access platform may include either or both of an IMS and an XMPP platform.

In various embodiments, the enabling the browser-based application to receive from the multimedia access platform one or more types of multimedia may include translating media between the browser-based application and domains of the multimedia access platform.

In various embodiments, the browser-based application may include a WebRTC application in accordance with the W3C, and the browser-based application may include a native or hybrid web application.

In various embodiments, process 600 may further include the one or more processors enabling the browser-based application to retrieve from a data management server information of contacts associated with the user of the mobile device. In various embodiments, the data management server may include an XDMS.

In various embodiments, the method may further include communicating to the browser-based application, and receiving a query from the browser-based application in response to the communicating. In various embodiments, the communicating may include communicating by a push mechanism. In various embodiments, the communicating to the browser-based application may include communicating to the browser-based application in response to receiving a notification regarding an event. In various embodiments, the event may include an incoming call for the user of the mobile device, an incoming message for the user of the mobile device, a presence state, or network degradation.

Figure 7:
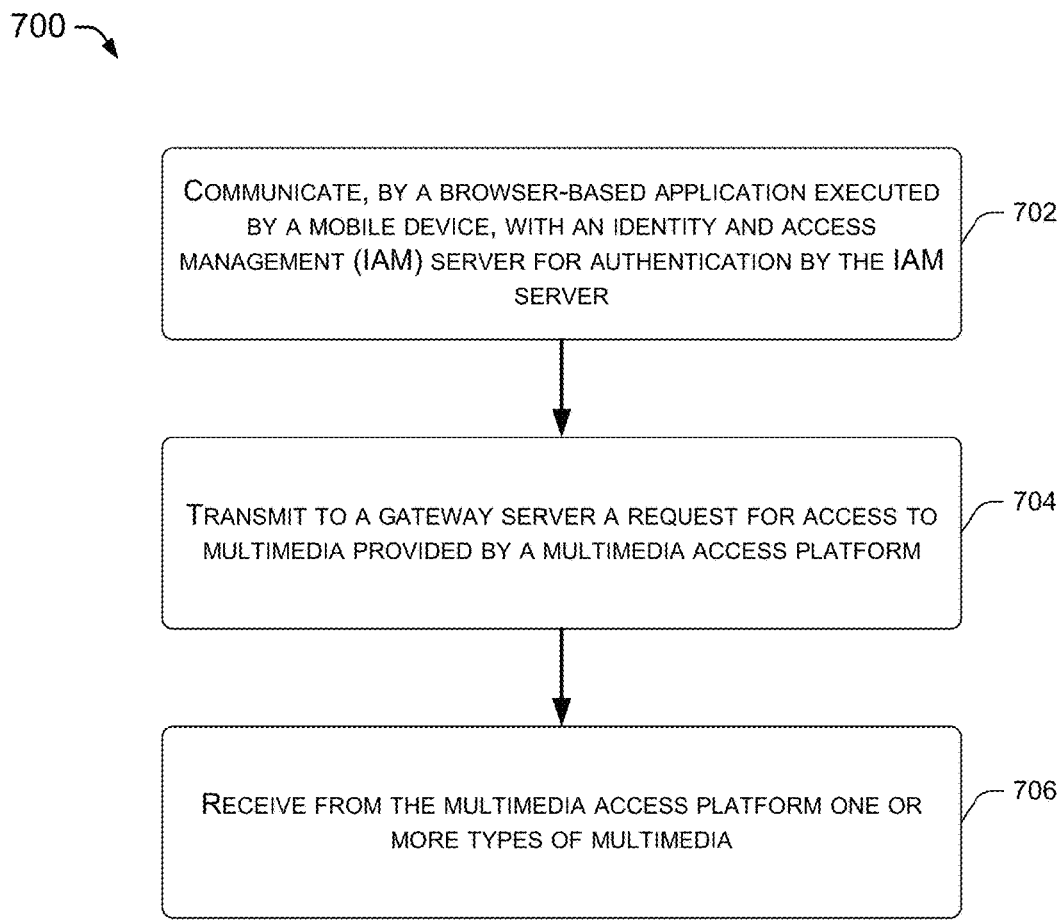
FIG. 7 illustrates a flow diagram of an example process implemented in a mobile device in accordance with an embodiment of the present disclosure.

FIG. 7 illustrates a flow diagram of an example process 700 implemented in a mobile device in accordance with an embodiment of the present disclosure. Process 700 may be implemented by browser-based application 184 or 194 executed by mobile device 182 or 192 of FIG. 1, WebRTC application 210 of mobile device architecture 200 of FIG. 2, or one or more processors 504 of example mobile device 500 of FIG. 5. Further, process 700 may include one or more operations, actions, or functions depicted by one or more blocks 702, 704 and 706. For illustrative purpose, operations of process 700 are described below form the perspective of browser-based application 184 of mobile device 182 of FIG. 1. Process 700 may begin at 702.

At 702, browser-based application 184 executed by a mobile device 182 communicates with an IAM server (e.g., one or more IAM servers 130) for authentication by the IAM server.

At 704, browser-based application 184 transmits to a gateway server (e.g., one or more WebRTC gateway servers 112) a request for access to multimedia provided by a multimedia source (e.g., multimedia access platform 120).

At 706, browser-based application 184 receives from the multimedia access platform one or more types of multimedia.

In various embodiments, browser-based application 184 may include a WebRTC application in accordance with W3C, and the browser-based application may include a native or hybrid web application.

In various embodiments, process 700 may further include browser-based application 184 retrieving from a data management server information of contacts associated with a user of the mobile device. In various embodiments, the data management server may include an XDMS.

In various embodiments, the method may further include browser-based application 184 receiving a communication from the gateway server, and transmitting a query to the gateway server in response to receiving the communication. In various embodiments, the receiving the communication may include receiving the communication by a push mechanism. In various embodiments, the receiving the communication from the gateway server may include receiving the communication from the gateway server in response to the gateway server receiving a notification regarding an event. In various embodiments, the event may include an incoming call for the user of the mobile device, an incoming message for the user of the mobile device, a presence state, or network degradation.

In various embodiments, process 700 may further include browser-based application 184 transmitting a notification to the gateway server in response to a change of an IP address associated with the mobile device.

In various embodiments, process 700 may further include browser-based application 184 transmitting a notification to the gateway server in response to a change of a network associated with the mobile device.

Figure 8:
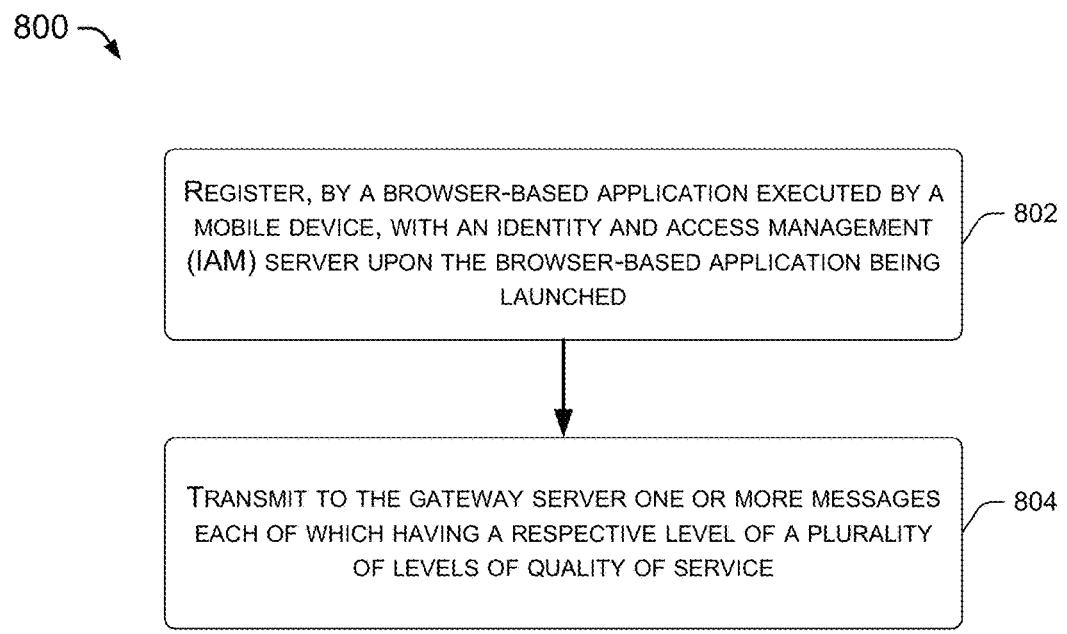
FIG. 8 illustrates a flow diagram of another example process implemented in a mobile device in accordance with an embodiment of the present disclosure.

FIG. 8 illustrates a flow diagram of an example process 800 implemented in a mobile device in accordance with an embodiment of the present disclosure. Process 800 may be implemented by browser-based application 184 or 194 executed by mobile device 182 or 192 of FIG. 1, WebRTC application 210 of mobile device architecture 200 of FIG. 2, or one or more processors 504 of example mobile device 500 of FIG. 5. Further, process 800 may include one or more operations, actions, or functions depicted by one or more blocks 802 and 804. For illustrative purpose, operations of process 800 are described below form the perspective of browser-based application 184 of mobile device 182 of FIG. 1. Process 800 may begin at 802.

At 802, browser-based application 184 executed by a mobile device 182 registers with an IAM server (e.g., one or more IAM servers 130) upon the browser-based application being launched.

At 804, browser-based application 184 transmits to the gateway server one or more messages. Each of the messages has a respective level of a plurality of levels of quality of service (QoS).

In various embodiments, the plurality of levels of QoS may include a first QoS level for IMS signaling with non-GBR and a delay budget of 150 ms and $10^{-6}$ packet loss rate, a second QoS level for voice calls with GBR and a delay budget of 100 ms and $10^{-2}$ packet loss rate, and a third QoS level for video calls with GBR and a delay budget of 150 ms and $10^{-3}$ packet loss rate.

In various embodiments, the one or more messages may include one or more signaling messages and one or more bearer messages.

In various embodiments, the one or more bearer messages may include at least a bear message with GBR or a bear message with non-GBR.

In various embodiments, in registering, browser-based application 184 may perform operations including: retrieving credential information from a UICC of the mobile device; transmitting the credential information to the IAM server for authentication by the IAM server; and receiving one or more messages from the IAM server indicating authorization to access multimedia provided by a multimedia access platform, which may include either or both of an IMS and an XMPP platform.

In various embodiments, process 800 may further include browser-based application 184 communicating with a data input or output device of the mobile device. The data input or output device of the mobile device may include a camera, a microphone, or both.

In various embodiments, process 800 may further include browser-based application 184 receiving from a multimedia access platform one or more types of multimedia. At least one of the one or more messages may include a request for access to multimedia provided by the multimedia access platform.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
receiving, by one or more processors, from a browser-based application executed by a mobile device a request for access to one or more IP Multimedia Subsystem (IMS) clients through a multimedia access platform;
retrieving information from a profile associated with a user of the mobile device from an identity and access management (IAM) server, the profile indicating at least one IP Multimedia Subsystem (IMS) client of the one or more IP IMS clients associated with the request for access as being accessible to the browser-based application;
establishing, within a traffic flow template, a dedicated bearer for signaling via the one or more IP IMS clients, the traffic flow template including one or more Quality of Service (QoS) parameters, wherein the one or more QoS parameters include a first QoS level for IP IMS signaling with non-guaranteed bit rate (non-GBR) and a first delay budget of 150 ms and $10^{-6}$ packet loss rate, a second QoS level for voice calls with guaranteed bit rate (GBR) and a second delay budget of 100 MS and $10^{-2}$ packet loss rate, and a third QoS level for video calls with GBR and a third delay budget of 150 ms and $10^{-3}$ packet loss rate;
determining an acceptable user experience, based at least in part on the one or more QoS parameters; and
providing access to the at least one IP IMS client of the one or more IP IMS clients from the multimedia access platform through the browser-based application, based at least in part on the acceptable user experience.

2. The method of claim 1, wherein providing access to the at least one IP IMS client further includes providing access to one or more types of multimedia, in response to an authentication by the IAM server of an identity of the user of the mobile device.

3. The method of claim 1, wherein providing access to the at least one IP IMS client further includes sending communication from the browser-based application to the multimedia access platform in accordance with a signaling protocol of the multimedia access platform, and wherein the multimedia access platform comprises at least one of an IP Multimedia Subsystem (IMS) or an extensible messaging and presence protocol (XMPP) platform.

4. The method of claim 2, further comprising:
transcoding the one or more types of multimedia from a first codec associated with a domain of the multimedia access platform to a second codec associated with the browser-based application, and
wherein providing access to the at least one IP IMS client further includes providing the mobile device with the one or more types of multimedia that is transcoded to the browser-based application.

5. The method of claim 1, wherein the browser-based application comprises a Web Real-Time Communication (WebRTC) application in accordance with a World Wide Web Consortium (W3C), and wherein the browser-based application comprises a native or hybrid web application.

6. The method of claim 1, further comprising providing, to the browser-based application, information of contacts associated with the user of the mobile device from a data management server.

7. The method of claim 6, wherein the data management server comprises an extensible markup language (XML) data management server (XDMS).

8. The method of claim 1, further comprising:
communicating to the browser-based application; and
receiving a query from the browser-based application in response to the communicating.

9. The method of claim 8, wherein communicating to the browser-based application comprises communicating to the browser-based application in response to receiving a notification regarding an event, the event comprising one of an incoming call for the user of the mobile device, an incoming message for the user of the mobile device, a presence state, or a network degradation.

10. A computing device, comprising:
memory configured to store at least a set of instructions; and
one or more processors coupled to the memory and configured to execute the set of instructions to perform operations comprising:
receiving from a browser-based application executed by a mobile device a request for access to multimedia provided by a multimedia access platform comprising an IP Multimedia Subsystem (IMS);
retrieving information from a profile associated with a user of the mobile device from an identity and access management (IAM) server, the profile indicating at least one IP Multimedia Subsystem (IMS) client of a plurality of IMS clients that are associated with the multimedia access platform as being accessible to the browser-based application;
establishing, within a traffic flow template, a dedicated bearer for signaling via the at least one IP IMS client, the traffic flow template including one or more Quality of Service (QoS) parameters, wherein the one or more QoS parameters include a first QoS level for IP IMS signaling with non-guaranteed bit rate (non-GBR) and a first delay budget of 150 ms and $10^{-6}$ packet loss rate, a second QoS level for voice calls with guaranteed bit rate (GBR) and a second delay budget of 100 MS and $10^{-2}$ packet loss rate, and a third QoS level for video calls with GBR and a third delay budget of 150 ms and $10^{-3}$ packet loss rate; and
providing access to one or more types of multimedia associated with the at least one IP IMS client from the multimedia access platform to the browser-based application based at least in part on the QoS parameters and information in the profile associated with the user of the mobile device.

11. The computing device of claim 10, wherein the providing includes providing the one or more types of multimedia after the user of the mobile device is authenticated by the IAM server.

12. The computing device of claim 10, wherein the one or more processors are further configured to perform operations comprising:
communicating with the multimedia access platform in accordance with a Session Initiation Protocol (SIP).

13. The computing device of claim 10, wherein the providing includes providing media that is translated between the browser-based application and domains of the multimedia access platform.

14. The computing device of claim 10, wherein the one or more processors are further configured to perform operations comprising:
providing, to the browser-based application, information of contacts associated with the user of the mobile device from an extensible markup language (XML) data management server (XDMS).

15. The computing device of claim 10, wherein the one or more processors are further configured to perform operations comprising:
communicating to the browser-based application by a push mechanism; and
receiving a query from the browser-based application in response to the communicating.

16. The computing device of claim 15, wherein the communicating to the browser-based application comprises communicating to an operating system of the mobile device to wake up the browser-based application from a sleep mode.

17. The computing device of claim 15, wherein the communicating to the browser-based application comprises communicating to the browser-based application in response to receiving a notification regarding an event.

18. The computing device of claim 17, wherein the event comprises an incoming call for the user of the mobile device, an incoming message for the user of the mobile device, a presence state, or network degradation.

19. A method, comprising:
sending, by a browser-based application executed by a mobile device a first request to authenticate a user at an identity and access management (IAM) server, the IAM server configured to authenticate a user identity that is associated with the mobile device for access to one or more types of multimedia from a multimedia access platform; transmitting, by the browser-based application, a second request for access to multimedia provided by the multimedia access platform to a gateway server; and
receiving via a dedicated bearer established within a traffic flow template by the multimedia access platform, access to one or more types of multimedia, the one or more types of multimedia being translated by the gateway server from a first codec in a first domain of the multimedia access platform to a second codec that is in a second domain of the browser-based application, wherein the traffic flow template includes one or more Quality of Service (QoS) parameters, wherein the one or more QoS parameters include a first QoS level for IP IMS signaling with non-guaranteed bit rate (non-GBR) and a first delay budget of 150 ms and $10^{-6}$ packet loss rate, a second QoS level for voice calls with guaranteed bit rate (GBR) and a second delay budget of 100 MS and $10^{-2}$ packet loss rate, and a third QoS level for video calls with GBR and a third delay budget of 150 ms and $10^{-3}$ packet loss rate; and accessing, at the browser-based application and via the multimedia access platform, the one or more types of multimedia following an authentication of the user by the IAM server, the multimedia access platform providing access based at least in part on the one or more QoS parameters.

20. The method of claim 19, wherein the browser-based application comprises a Web Real-Time Communication (WebRTC) application in accordance with a World Wide Web Consortium (W3C), and wherein the browser-based application comprises a native or hybrid web application.

21. The method of claim 19, further comprising:
retrieving, from a data management server, information of contacts associated with the user of the mobile device.

22. The method of claim 21, wherein the data management server comprises an extensible markup language (XML) data management server (XDMS).

23. The method of claim 19, further comprising:
receiving a communication from the gateway server; and
transmitting a query to the gateway server in response to receiving the communication.

24. The method of claim 23, wherein receiving the communication comprises one of receiving the communication by a push mechanism, or receiving the communication from the gateway server in response to the gateway server receiving a notification regarding an event.

25. The method of claim 24, wherein the event comprises an incoming call for the user of the mobile device, an incoming message for the user of the mobile device, a presence state, or network degradation.

26. The method of claim 19, further comprising:
transmitting a notification to the gateway server in response to one of a change of an IP address associated with the mobile device, or a change of a network associated with the mobile device.

27. A method, comprising:
registering, by a browser-based application executed by a mobile device, with an identity and access management (IAM) server of a network upon the browser-based application being launched;
transmitting, to a gateway server, one or more messages each of which have a respective level of a plurality of levels of quality of service (QoS), the plurality of levels of QoS including a first QoS level for IP IMS signaling with non-guaranteed bit rate (non-GBR) and a first delay budget of 150 ms and $10^{-6}$ packet loss rate, a second QoS level for voice calls with guaranteed bit rate (GBR) and a second delay budget of 100 MS and $10^{-2}$ packet loss rate, and a third QoS level for video calls with GBR and a third delay budget of 150 ms and $10^{-3}$ packet loss rate; and
receiving, via a dedicated bearer established within a traffic flow template by a multimedia access platform, access to one or more types of multimedia based at least in part on the plurality of levels of QoS and information from a profile associated with a user of the mobile device that is retrieved from an identity and access management (IAM) server, the profile indicating at least one IP Multimedia Subsystem (IMS) client of a plurality of IMS clients that are associated with the multimedia access platform as being accessible to the browser-based application.

28. The method of claim 27, wherein the one or more messages comprises one or more signaling messages and one or more bearer messages, the one or more bearer messages comprising at least a bear message with a guaranteed bit rate (GBR) or a bear message with a non-GBR.

29. The method of claim 27, wherein the registering comprises:
retrieving credential information from a universal integrated circuit card (UICC) of the mobile device;
transmitting the credential information to the IAM server for authentication by the IAM server; and
receiving one or more messages from the IAM server indicating authorization to access multimedia provided by the multimedia access platform comprising either or both of an IP Multimedia Subsystem (IMS) and an extensible messaging and presence protocol (XMPP) platform.

30. The method of claim 27, further comprising: communicating with a data input or output device of the mobile device, the data input or output device of the mobile device corresponding to at least one of a camera or a microphone.

31. The method of claim 27, wherein at least one of the one or more messages comprises a request for access to multimedia provided by the multimedia access platform.

32. A mobile device, comprising:
memory configured to store at least a set of instructions; and
one or more processors coupled to the memory and configured to execute the set of instructions to perform operations comprising:
executing a browser-based application to communicate with an identity and access management (IAM) server for authentication of a user by the IAM server, the IAM server configured to authenticate a user identity that is associated with the mobile device for access to one or more types of multimedia from a multimedia access platform;
transmitting to a gateway server a request for access to multimedia provided by the multimedia access platform;
receiving, via a dedicated bearer established within a traffic flow template by the multimedia access platform, access to one or more types of multimedia, the one or more types of multimedia being translated by the gateway server from a first codec in a first domain of the multimedia access platform to a second codec that is in a second domain of the browser-based application, wherein the traffic flow template includes one or more Quality of Service (QoS) parameters, wherein the one or more QoS parameters include a first QoS level for IP IMS signaling with non-guaranteed bit rate (non-GBR) and a first delay budget of 150 ms and $10^{-6}$ packet loss rate, a second QoS level for voice calls with guaranteed bit rate (GBR) and a second delay budget of 100 MS and $10^{-2}$ packet loss rate, and a third QoS level for video calls with GBR and a third delay budget of 150 ms and $10^{-3}$ packet loss rate; and
accessing, at the browser-based application and via the multimedia access platform, the one or more types of multimedia following the authentication of the user by the IAM server, the multimedia access platform providing access to the one or more types of multimedia, based at least in part on the one or more QoS parameters.

33. The mobile device of claim 32, wherein the browser-based application comprises a Web Real-Time Communication (WebRTC) application in accordance with a World Wide Web Consortium (W3C), and wherein the browser-based application comprises a native or hybrid web application.

34. The mobile device of claim 32, wherein the one or more processors are further configured to perform operations comprising: retrieving from an extensible markup language (XML) data management server (XDMS) information of contacts associated with the user of the mobile device.

35. The mobile device of claim 32, wherein the one or more processors are further configured to perform operations comprising:
receiving a communication from the gateway server; and
transmitting a query to the gateway server in response to receiving the communication.

36. The mobile device of claim 35, wherein the receiving the communication comprises receiving the communication by a push mechanism.

37. The mobile device of claim 35, wherein the receiving the communication from the gateway server comprises receiving the communication from the gateway server in response to the gateway server receiving a notification regarding an event.

38. The mobile device of claim 37, wherein the event comprises an incoming call for the user of the mobile device, an incoming message for the user of the mobile device, a presence state, or network degradation.

39. The mobile device of claim 32, wherein the one or more processors are further configured to perform operations comprising:
accessing one or more input devices or one or more output devices of the mobile device to support the browser-based application; and
accessing a universal integrated circuit card (UICC) of the mobile device to support the browser-based application.

40. The mobile device of claim 32, wherein the one or more processors are further configured to perform operations comprising:
receiving periodically a wake-up message from the gateway server; and transmitting a response message to the gateway server in response to receiving the wake-up message.

41. The mobile device of claim 32, wherein the one or more processors are further configured to perform operations comprising: transmitting a notification to the gateway server in response to a change of an IP address or a network associated with the mobile device.

42. The method of claim 1, wherein the IAM server is further configured to authenticate a user identity that is associated with the mobile device for access to one or more types of multimedia from the multimedia access platform.

43. The method of claim 1, further comprising:
receiving a first signal of an event media that is directed towards the mobile device, the event media corresponding to one of an incoming voice call or an incoming video call; and
transmitting, a second signal to an operating system of the mobile device that causes an execution of the browser-based application on the mobile device.

44. The method of claim 43, further comprising:
determining that the event media is anchored in a service provider network associated with the at least one IP IMS client; and
translating the event media from a first codec of the at least one IP IMS client to a second codec of the browser-based application.

45. The method of claim 1, wherein the traffic flow template is defined as packet filters that are associated with at least on a protocol, an IP packet destination, or a source IP address.

46. The method of claim 45, wherein the packet filters are further associated with an Encapsulated PostScript (EPS) bearer, the EPS bearer including one or more Quality of Service (QoS) parameters, and further comprising:
determining at least one of a GBR resource, a non-GBR resource, a packet delay budget, or a packet loss rate, based at least in part on the one or more QoS parameters.

47. The computing device of claim 10, further comprising:
determining an acceptable user experience, based at least in part on the one or more QoS parameters, and
wherein, providing access to the one or more types of multimedia is further based at least in part on the acceptable user experience.

* * * * *